2,784,102

METHODS OF PRESERVING MEAT

Nathan Herman, Philadelphia, and Morris Herman, Rydal, Pa.

No Drawing. Application September 21, 1956, Serial No. 611,366

4 Claims. (Cl. 99—157)

This application is a continuation in part of our prior application filed October 19, 1955, Serial No. 541,527, now abandoned.

This invention relates to methods of preserving meat, and more particularly to the production of tasajo or jerked beef.

It is the principal object of the present invention to provide an improved method of preserving meat, and particularly beef and the like, so that the same can be exposed to varied atmospheric conditions without the necessity for refrigeration, and free from the likelihood of spoilage.

It is a further object of the present invention to provide an improved method of curing meat so that the product, when properly cured and dried, can be exposed to heat, to the rays of the sun, or to insects, without any ill effects or deterioration of the product.

It is a further object of the present invention to provide improved methods of curing meat, such as beef and the like, by which an improved product is obtained.

It is a further object of the present invention to provide improved methods of preserving meat in which the steps employed are relatively simple and can readily be kept under control.

Other objects and advantageous features of the invention will be apparent from the specification and claims.

The nature and characteristic features of the invention will be more readily understood from the following description, although it should, of course, be understood that various modifications and changes can be made in the steps disclosed without departing from the spirit of the invention.

In accordance with the present invention, fresh beef cuts are employed, these being of a suitable size in accordance with the desired size of the finished product and pieces having sizes of the order of ten to fifteen pounds have been found suitable.

If desired, as a preliminary treatment the cuts can be placed in a vat or vessel containing a saturated solution of rock salt, but in which no additives have been included. Such additives, if employed would have a tendency to produce a corned beef effect. This would be detrimental insofar as the desired end product is concerned.

The cuts of meat, if brine treatment is employed, are retained in the brine for a minimum period of 72 hours, a longer period being advantageous with some beef cuts, and a considerably longer time and up to several days additional can be employed without causing any difficulty.

The cuts are then removed from the brine, and placed in a container where they are allowed to thoroughly drain for a minimum period of 24 hours and so that all blood is removed from the meat.

Following the drainage period, the treated cuts are then placed in suitable vats or vessels with drainage outlets at the bottom. If desired the preliminary brine treatment and draining can be eliminated and the procedure initiated with untreated fresh cuts of beef. The pretreated or untreated cuts are placed as follows:

A layer of cuts is covered with a one inch layer of flake salt, on which another layer of cuts is provided, with another similar layer of flake salt thereon, the vat being filled in this manner, with a press placed at the top to aid in drainage. The meat is retained in this vessel for a minimum period of five days, the temperature being maintained at 40° F. or colder, but not as low as freezing.

At the conclusion of this period, the pieces of meat are then relaid. The pieces of meat previously at the top of the vessel are placed at the bottom of the vessel, covered with a one inch layer of flake salt, an additional layer of meat is placed on the salt layer, additional alternate layers being thus provided, as before, with a press on the top so as to aid in drainage. This treatment is effected at a room temperature of not less than 60° F. and for a period of at least five days until every vestige of blood has been removed from the meat. This can be recognized both from the color taken by the meat, which is very dark or gray, and, also, by the physical change which has occurred, the properly treated meat being firm to the touch.

The treatment at different temperature levels, as pointed out above, facilitates the removal of blood by the expansion and contraction of the veins and pores.

When the meat satisfies these requirements it is ready for drying. It has been found that wet drying, that is, with steam or the like, or smoking, does not produce the desired product, and the drying which is employed consists in hanging the meat on conventional smokehouse trees, or other supports, with spaces of at least two inches between the various pieces of meat. The meat as thus hung is allowed to remain at room temperature overnight before placing in ovens or other chambers for further drying.

The further drying is effected by supplying to a chamber, in which the meat is hung, a constant flow of hot dry air with the temperature of the air maintained in the range from about 100 to about 120° F. This drying with heated dry air is continued until the meat becomes very hard, and encrusted with a white protecting crust which aids in the preservation. Such drying is ordinarily completed in about four days. At this stage it will be noted that the meat has a slight somewhat sharp odor bordering on, but short of, a rancid odor.

The meat as thus prepared has a very dark color, is very dry to the touch, and within a matter of a few hours after completion of the air drying a freshly cut slice will have formed thereon a new white protective crust without any further treatment. It is in this form that the meat is ready for shipping and will remain in a preserved condition without the neecssity for refrigeration until ready for use. At the same time, there is no tendency of insects to collect thereon, nor is there any development of insect eggs if deposited thereon.

The manner of use varies with different users, but customarily the meat is sliced to the desired thickness and then soaked in water for several hours before the same is cooked by boiling, stewing, broiling, or in any other desired manner. The soaking in water removes a portion of the salt and at the same time restores water to the meat to replace in part that which was previously removed. Such replacement may amount to about 75% of the original water content. The meat product, after the replacement of water, will require refrigeration because of its restoration substantially to its initial condition prior to the treatment as herein described.

We claim:

1. The method of preserving beef cuts which comprises stacking fresh cuts of beef in alternate layers with flake salt for a period of at least five days at a temperature of the order of 40° F. and draining off resulting liquid, stacking the cuts in alternate layer with flake salt for a period of at least five days at a temperature of the order of 60° F. and draining off resulting liquid, and thereafter air drying the cuts with air at a temperature of about 100 to 120° F. for a period of about four days and until a white crust forms on the exterior.

2. Beef cuts preserved in accordance with the method defined in claim 1.

3. The method of preserving beef cuts which comprises placing cuts of beef in saturated salt brine for a period of at least 72 hours, draining the excess liquid from the cuts, placing and retaing the cuts in stacked alternate layers with flake salt for a period of at least five days at a temperature of the order of 40° F. and draining off resulting liquid, restacking the cuts in alternate layers with flake salt for a period of at least five days at a temperature of the order of 60° F. and draining off resulting liquid, and suspending the cuts in spaced relation to each other and drying the cuts with air at a temperature of 100 to 120° F. for a period of about four days and until a white crust forms on the exterior.

4. Beef cuts preserved in accordance with the method defined in claim 3.

References Cited in the file of this patent

UNITED STATES PATENTS

| | | |
|---|---|---|
| 134,965 | Atkinson | Jan. 21, 1873 |
| 1,385,352 | Allen | July 26, 1921 |
| 2,180,165 | Nietiedt | Nov. 14, 1939 |
| 2,688,555 | Komarik et al. | Sept. 7, 1954 |
| 2,688,556 | Komarik et al. | Sept. 7, 1954 |

OTHER REFERENCES

"Locker Management," August 1949, pages 14 to 17, inclusive.